United States Patent [19]

Tortorici et al.

[11] Patent Number: 4,963,652

[45] Date of Patent: Oct. 16, 1990

[54] INKS CONTAINING GLYCEROPHOSPHOLIPIDS AND POLYESTERS

[75] Inventors: Frank J. Tortorici; Kenneth R. Barton; Lawrence D. Queen, all of Kingsport, Tenn.

[73] Assignee: Eastman Kodak Company, Rochester, N.Y.

[21] Appl. No.: 441,784

[22] Filed: Nov. 27, 1989

[51] Int. Cl.$^5$ .................. C08L 67/02; C08L 67/06
[52] U.S. Cl. .................. 524/604; 524/602; 524/603; 524/607; 528/272; 528/274; 528/275; 528/286; 528/287; 528/291; 528/292; 528/295.5; 528/300; 528/305; 528/308; 528/308.6; 525/420; 525/425; 525/437; 525/444.5; 525/448; 525/450; 523/160; 427/336; 428/423.1; 428/480; 106/230; 106/243; 106/23; 106/24; 106/28; 106/30
[58] Field of Search ............ 528/272, 274, 275, 286, 528/287, 291, 292, 295.5, 300, 305, 308, 308.6; 525/420, 425, 437, 444.5, 448, 450; 524/602, 603, 604, 607; 523/160; 427/336; 428/423.1, 480; 106/243, 230, 23, 24, 28, 30

[56] References Cited

U.S. PATENT DOCUMENTS

| | | |
|---|---|---|
| 3,546,008 | 12/1970 | Shields et al. .............. 117/138.8 |
| 3,734,874 | 5/1973 | Kibler et al. .............. 524/603 |
| 3,779,993 | 12/1973 | Kibler et al. .............. 528/295 |
| 4,014,833 | 3/1977 | Story .............. 524/377 |
| 4,056,494 | 11/1977 | Kronstein et al. .............. 106/243 |
| 4,126,591 | 11/1978 | Kronstein et al. .............. 524/17 |
| 4,148,779 | 4/1979 | Blackwell et al. .............. 524/321 |
| 4,233,196 | 11/1980 | Sublett .............. 524/602 |
| 4,304,900 | 12/1981 | O'Neill .............. 528/290 |
| 4,304,901 | 12/1981 | O'Neill .............. 528/290 |
| 4,305,853 | 12/1981 | Kronstein et al. .............. 106/432 |
| 4,335,220 | 6/1982 | Coney .............. 523/414 |
| 4,340,519 | 7/1982 | Kotera et al. .............. 523/414 |
| 4,520,153 | 5/1985 | Kronstein et al. .............. 524/145 |
| 4,704,309 | 11/1987 | Coney et al. .............. 427/258 |
| 4,729,918 | 3/1988 | Neuberg et al. .............. 428/207 |
| 4,735,860 | 4/1988 | Mizobuchi et al. .............. 428/423.1 |
| 4,738,785 | 4/1988 | Langston et al. .............. 210/738 |
| 4,772,491 | 9/1988 | Nealy et al. .............. 427/336 |
| 4,847,316 | 7/1989 | Schick et al. .............. 524/88 |
| 4,855,344 | 8/1989 | Nealy et al. .............. 524/86 |

OTHER PUBLICATIONS

"The Industrial Lecithin Book", copyright 1989, Central Soya Company, Inc.

Primary Examiner—John Kight III
Assistant Examiner—S. A. Acquah
Attorney, Agent, or Firm—Thomas R. Savitsky; William P. Heath, Jr.

[57] ABSTRACT

An aqueous printing ink or its semi-aqueous or non-aqueous concentrate exemplified as comprising a substantially homogeneous system of the components:

(1) from about 4 to about 80 weight % of one or more polyester materials having an acid component of from about 75 to about 84 mole % isophthalic acid and conversely from about 25 to about 16 mole % 5-sodiosulfoisophthalic acid, and having a glycol component of from about 45 to about 60 mole % diethylene glycol and conversely from about 55 to about 40 mole % 1,4-cyclohexanedimethanol or ethylene glycol or mixtures thereof;
(2) from about 0 to about 60 weight % of pigment material;
(3) from substantially none to about 90 weight % of water; and
(4) from about 0.25 to about 5 weight % of a diacylglycerophospholipid.

19 Claims, No Drawings

INKS CONTAINING GLYCEROPHOSPHOLIPIDS AND POLYESTERS

TECHNICAL FIELD

This invention concerns aqueous inks and their substantially non- or semi-aqueous concentrates, containing certain diacyl-glycerophospholipids and certain water-dispersible or dissipatable polyesters and polyesteramides. The inks have improved block resistance, rub resistance, and slide angle properties. These inks have utility for letter press, intaglio, gravure, flexographic and other printing processes adaptable to the use of aqueous inks. The term "ink" or "ink composition" is used herein in its broad sense as including the use thereof for coatings in all forms such as letters, patterns, and coatings without design, whether or not such coatings contain pigments.

BACKGROUND OF THE INVENTION

Inks containing a water-dissipatable polyester or polyesteramide are well known in the art (see, for example, U.S. Pat. Nos. 4,704,309 and 4,738,785). Inks containing such a polymeric material have many desirable properties such as good adhesion to a variety of substrates and a wide viscosity range.

However, because of the wide range of printing conditions and substrates used in the printing industry, a given ink formulation can have ideal properties for some applications and poor properties for other applications. Block resistance, rub resistance, and reduced slide angle are properties that are highly desirable for many ink applications. It would be highly desirable to have inks containing water-dispersible polyesters or polyesteramides wherein these properties are improved.

Certain diacyl-glycerophospholipids such as lecithin are known to be useful as surfactants for some applications. We have surprisingly found that the addition of certain amounts of glycerophospholipids as hereinafter described, to certain aqueous inks containing a polyester material as hereinafter described, improves the block resistance, rub resistance, and slide angle properties of these inks.

SUMMARY OF THE INVENTION

It has now been discovered that the water-dissipatable polyester material as described herein, when mixed with a diacyl-glycerophospholipid, will provide to ink compositions good block resistance, good rub resistance, and reduced slide angle without concomitant substantial sacrifice of the advantages obtained by use of the water-dissipatable polyester material alone. More specifically, the present invention is directed to an ink composition or concentrate thereof comprising:

(A) About 4 to 80 weight percent of one or more linear water-dissipatable or dispersible polymers having carbonyloxy linking groups i.e., ester groups of the formula

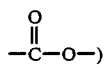

in the linear molecular structure wherein up to 80% of the linking groups are carbonylamido linking groups, i.e., amide groups of the formula

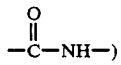

the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows wherein all stated mole percentages are based on the total of all acid, hydroxyl, and amino equivalents being equal to 200 mole %:

(a) at least one difunctional dicarboxylic acid;

(b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;

(c) at least one difunctional reactant selected from a glycol or a mixture of a glycol and diamine having two —NRH groups, the glycol containing two —CH$_2$—OH groups of which (1) at least 15 mole % is a poly(ethylene glycol) having the structural formula

n being an integer of from 2 to about 20, or (2) of which from about 0.1 to less than about 15 mole % is a poly(ethylene glycol) having the structural formula

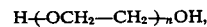

n being an integer of between 2 and about 500, and with the proviso that the mole % of said poly(ethylene glycol) within said range is inversely proportional to the quantity of n within said range; and (d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants;

wherein each R in the (c) and (d) reactants is a hydrogen atom or an alkyl group of 1 to 4 carbons;

(B) 0 to about 60 weight percent pigment material;

(C) 0 to about 95 weight percent water; and (D) an effective amount of a diacyl-glycerophospholipid.

The effective amount of Component (D) is that amount necessary to improve the block resistance, rub resistance, and/or slide angle property of the ink relative to a control ink without Component (D).

DETAILED DESCRIPTION OF THE INVENTION

As used herein, the term "water-dissipatable polyester", "water-dissipatable polyester material", "polyester material", or "polyester" refers to Component (A) described hereinabove. Examples of suitable polyesters can be found in U.S. Pat. Nos. 4,148,779; 4,304,901; 4,233,196; 3,546,008; and 3,779,993, incorporated herein by reference in their entirety.

Whenever the term "water-dissipatable" or "water-dispersible" is used in this description, it will be understood to refer to the activity of a water or aqueous solution on the applicable polymer. The term is specifically intended to cover those situations wherein the solution dissolves and/or disperses the polymer material therein and/or therethrough.

A preferred amount of Component (D) is from about 0.25 to about 5 weight percent (based on the total weight of Components (A) through (D)); a more preferred amount is about 0.5 to about 2 weight percent, and the most preferred amount is about 0.75 to about 1 weight percent.

The inks of the present invention have an unexpected improvement in block resistance, rub resistance, and/or slide angle. Blocking can be defined as an undesirable adhesion between layers of printed material such as might occur under moderate pressure and/or temperature in storage or use, to the extent that damage to at least one surface is visible upon their separation. It is preferred, concerning block resistance, that the ink compositions of the present invention, when printed onto a substrate, do not block below about 100° F. (37.78° C.) (i.e., a maximum block resistance temperature of at least about 100° F.); more preferably do not block below about 120° F. (48.89° C.), for 5 seconds on a Sentinel Heat Sealer at 40 psi (275.79 kilopascal). It is also preferred, concerning rub resistance, that the ink compositions of the present invention, when printed onto a substrate, have a rub resistance rating of no greater than about 3; preferably no greater than about 2; most preferably no greater than about 1, on a scale of 1 to 5 with 1 being best and 5 being worst. It is further preferred, concerning slide angle, that the ink compositions of the present invention, when printed onto a substrate, have a slide angle of no greater than about 20°; preferably no greater than about 15°; most preferably no greater than about 12°. Block resistance can be determined by the procedure described in Example 6 herein (which is in accordance with ASTM Procedure D-918), rub resistance can be determined by the procedure described in Example 8 herein (which is in accordance with British Standard Procedure BS-3110), and slide angle can be determined by the procedure described in Example 7 herein (which is in accordance with ASTM Procedure D.3248-73).

In the ink compositions of the present invention, it is preferred that Component (A) is present in an amount of about 5 to 40 weight percent, that Component (B) is present in an amount of about 0 to 35 weight percent, and that Component (C) is present in an amount of about 15 to 95 weight percent, more preferably 35 to 90 weight percent, such percentages being based on the total weight of Components (A) through (D). If the ink composition is a finished ink, it is preferred that at least about 0.5 weight percent of pigment (Component (B)) is present. More typically, in inks, at least about 1 weight percent of pigment is present, preferably at least about 5 weight percent. If the ink composition contains an organic pigment, typically such an organic pigment is present in an amount of about 17.5 weight percent or less of the total composition. If the ink composition contains an inorganic pigment, typically such inorganic pigment is present in an amount of about 50 weight percent or less of the total composition.

The ink compositions can optionally contain up to about 15 weight percent of the total composition, preferably up to about 3 weight percent, of one or more additional additives. Such additional additives include waxes such as Jonwax 26, Jonwax 120 (available from S. C. Johnson and Sons, Inc., Racine, Wis. 43403, U.S.A.), or Vanwax 35 (available from Vantage, Garfield, N.J. 07026); surfactants such as Surfynol 104 and Surfynol 440 (available from Air Products and Chemicals, Allentown, Pa. 18105); modifiers (for example, defoamers) such as WBT-409, Resolv (available from Vantage), Carbowet 990 (available from Vantage), Aerosol TO-75 (available from American Cyanamid, Wayne, N.J. 07470), Foamaster 111 (available from Henkel Corporation, Morristown, N.J. 07960); alcohols containing 1 to 10 carbon atoms such as ethanol, methanol, n-propyl alcohol, isopropyl alcohol, propylene glycol, propylene glycol monobutyl ether, ethylene glycol monobutyl ether, or ethylene glycol; biocides; pH stabilizers; dispersants; thickeners such as Acrysol RM-825 (available from Rohm & Haas, Philadelphia, Pa. 19105); and the like.

Typically, it is desirable to add a small amount of one or more pH stabilizers to the ink compositions to keep the pH within a desired range. For example, it is common to add about 0.1 weight percent sodium acetate to an ink or aqueous solution/dispersion of polyester.

Preferred amounts of certain additional additives in ink compositions of the present invention are set forth in the following table.

| Component | Weight Percent |
| --- | --- |
| Wax[a] | 0.0–3.0 |
| Surfactant[b] | 0.0–3.0 |
| Modifier[c] | 0.0–2.0 |
| Alcohol[d] | 0.0–10.0 |

[a] e.g., Jonwax 26,120, Vanwax 35
[b] e.g., Surfynol 104,440
[c] e.g., WBT-409, Resolv, Carbowet 990, Foamaster 111
[d] e.g., n-Propyl Alcohol, isopropyl Alcohol, Propylene Glycol, Ethylene Glycol Monobutyl Ether.

It is especially preferred to use as a modifier a defoamer or antifoam in an amount of about 0.05 to 0.25 weight percent; more preferred is about 0.1 to 0.25 weight percent. Biocides are typically present in an amount of from 0 to about 1 weight percent. Waxes are especially useful in certain ink compositions, especially overprints, and such inks typically contain at least 0.01 weight percent of one or more of said waxes.

In the water-dissipatable polyester useful in the present invention, the cation portion of the metallic sulfonate group is preferably a monovalent metal cation such as $Na^+$, $K^+$, or $Li^+$. Alternatively, the cation portion of the nonmetallic sulfonate group can be a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

Preferred examples of suitable poly(ethylene glycols) (i.e., reactant (c)(1)) useful in preparing the polyester of the invention include diethylene glycol, triethylene glycol, tetraethylene glycol, and pentaethylene, hexaethylene, heptaethylene, octaethylene, nonaethylene, and decaethylene glycols, and mixtures thereof. Preferably the poly(ethylene glycol) employed in the polyesters or polyesteramides of the present invention is diethylene glycol or triethylene glycol or mixtures thereof. Examples of relatively high molecular weight poly(ethylene glycols) (i.e., reactant (c)(2)) are available commercially under the designation "Carbowax", a product of Union Carbide. Poly(ethylene glycols) having molecular weights of from about 500 to about 5000 are especially suitable as reactant (c)(2) The remaining portion of the glycol component (i.e., reactant (c)) may consist of aliphatic, alicyclic, and aralkyl glycols. Preferred examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5.pentanediol; 1,6-hexanediol; 2,2,4-trimethyl-1,6-hexanediol; thiodiethanol; 1,2.cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the glycols.

The dicarboxylic acid component of the polyester of polyesteramide (i.e., reactant (a)) comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids.

Advantageous difunctional sulfo-monomer components (i.e., reactant (b)) are those wherein the sulfonate salt group is attached to an aromatic acid nucleus such as a benzene, naphthalene, diphenyl, oxydiphenyl, sulfonyldiphenyl, or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters, as well as metallosulfoaryl sulfonates. Reactant (b) may be either a dicarboxylic acid (or derivative thereof) containing a —$SO_3M$ group or a diol containing a —$SO_3M$ group. The metal ion of the sulfonate group (i.e., "M") may be $Na^+$, $Li^+$, $K^+$, $Mg^{++}$, $Ca^{++}$, $Cu^{++}$, $Fe^{++}$, or $Fe^{+++}$.

In the water-dissipatable polyester, it is preferred that none or very minor, e.g., less than about 10 mol percent based on all reactants, of reactant (d) is employed, that at least about 70 mol percent of reactant (c) is glycol, and that at least about 70 mol percent of all the hydroxy equivalents is present in the glycol. It is also preferred that a substantial portion of reactant (c) is a cycloaliphaticdimethanol, e.g., up to 50 mole percent of a cycloaliphaticdimethanol such as 1,4-cyclohexanedimethanol. Regarding reactant (a) of the polyester of the present invention, it is preferred that it is at least one aromatic dicarboxylic acid having up to 20 carbon atoms although minor amounts (e.g., up to 30 mole % of acid equivalent) of aliphatic dicarboxylic acids, preferably containing up to 20 carbon atoms, usually can also be employed. Terephthalic acid, isophthalic acid, and naphthalene dicarboxylic acid are the most preferred as reactant (a).

In preferred other embodiments of the invention:

the water-dissipatable polyester material comprises an acid component (moiety) of from about 75 to about 84 mole percent isophthalic acid and conversely from about 25 to 16 mole percent 5-sodiosulfoisophthalic acid, and a glycol component (moiety) of from about 45 to about 60 mole % diethylene glycol and conversely from about 55 to 40 mole percent 1,4-cyclohexanedimethanol or ethylene glycol (the term "moiety" as used herein designates the residual portion of the reactant acid or glycol which actually enters into or onto the polymer chain during the condensation or polycondensation reaction);

the inherent viscosity of the water-dissipatable polyester material is from about 0.28 to about 0.35, said acid component (moiety) comprises from about 80 to about 83 mole percent isophthalic acid and conversely from about 20 to about 17 mole percent 5-sodiosulfoisophthalicacid, and the glycol component (moiety) comprises from about 52 to about 56 mole percent diethylene glycol and conversely from about 48 to about 44 mole percent, 1,4-cyclohexanedimethanol;

the ink composition is printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide polypropylene, polyethylene or polystyrene;

after the ink composition is printed, substantially all water is evaporated; and after the ink composition is printed, a substantial portion of the initial metal cations of the water solubilizing sulfonate groups of the water-dissipatable polyester material has been replaced with an insolubilizing polyvalent metal cation, such as $Al^{+3}$, $Ca^{++}$, or the like as disclosed and in the manner described in U.S. Pat. Nos. 4,145,469 and 4,704,309, the disclosures of which are incorporated wherein by reference in their entirety. As stated therein, generally, based on the weight of the polymeric material, 0.05 percent to about 2.0 percent by weight solids of the polyvalent metal cation are required for effective insolubilization.

The inherent viscosities (I.V.) of the particular water-dissipatable polyester materials useful herein range from about 0.1 to about 1.0 determined according to ASTM D2857-70 procedure, in a Wagner Viscometer of lab Glass, Inc., of Vineland, New Jersey, having a ½ mL capillary bulb, using a polymer concentration of about 0.5% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(\eta) = \frac{\ln \frac{t_s}{t_o}}{C}$$

where:

($\eta$) = inherent viscosity at 25° C. at a polymer concentration of 0.5 g/100 mL of solvent;
ln = natural logarithm;
$t_2$ = sample flow time;
$t_0$ = solvent-blank flow time; and
C = concentration of polymer in grams per 100 mL of solvent = 0.5.

The units of the inherent viscosity throughout this application are in deciliters/gram.

As appreciated in the art, the exact components and properties of components desired for any given ink application can vary, and, therefore, routine experimentation may be required to determine the optional components and proportions of components for a given application and desired properties.

The diacyl-glycerophospholipids useful in the present invention are preferably naturally occurring, e.g., extracted from soybeans. The diacylglycerophospholipids preferably are of the chemical formula:

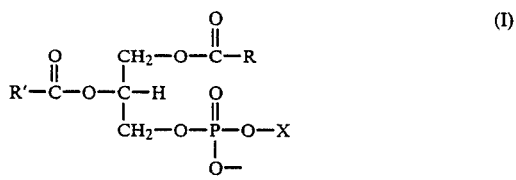

wherein R and R' are the same or different and are fatty alkyl groups containing up to 20 carbon atoms, and X is H or a residue of an alcohol. Suitable compounds of formula (I) are disclosed in, for example, *Lipid Biochemistry*, M. I. Gurr and A. T. James, 2nd Ed., Chapter IV, Chapman and Hall, London, 1971. Preferred X substituents are shown in Table 1 (other than H, the X substituents are depicted as alcohols—when actually bonded into the compound of formula (I), a hydroxyl group will be lost at the bonding site).

TABLE 1

| X | Name of Diacyl-Glycerophospholipid |
|---|---|
| H | Phosphatidic Acid |
| OH—CH$_2$CH$_2$N(CH$_3$) (Choline) | Phosphatidyl Choline (Lecithin) |
| OH—CH$_2$CH$_2$NH$_2$ (Ethanolamine) | Phosphatidyl Ethanolamine |
| OH—CH$_2$CH—NH$_2$ (Serine) <br>                              \| <br>                            COOH | Phosphatidyl Serine |
| Myo-Inositol | Phosphatidyl Inositol |
| Inositol-4-Phosphate | Phosphatidyl Inositol Phosphate, (Diphosphoinositide) |
| Inositol-4,5-Diphosphate | Phosphatidyl Inositol Disphosphate. (Triphosphoinositide) |
| Inositol Mannoside | Phosphatidyl Inositol Mannoside <br> X = 0,Monomannoside <br> X = 1,Dimannoside, etc. |
| CH$_2$OH—CHOH—CH$_2$OH (Glycerol) | Phosphatidyl Glycerol |
| CH$_2$O—C(=O)—CH(NH$_2$)—R (Aminoacyl Glycerol) <br> CHOH <br> CH$_2$OH | Aminoacyl Phosphatidyl Glycerol |
| Glucosaminyl Glycerol | Glucosaminyl Phosphatidyl Glycerol |

TABLE 1-continued

| X | Name of Diacyl-Glycerophospholipid |
|---|---|
| | Glycerol |

Regarding the R and R' substituents of the compound of formula (I), it is preferred that they are saturated or unsaturated and contain 16 to 20 carbon atoms. Preferred substituents are residues of palmitic, stearic, oleic, linoleic, and arachidonic acids.

The most preferred diacyl-glycerophospholipid is phosphatidyl choline, commonly known as pure lecithin. Although phosphatidyl choline is commonly known as pure lecithin, the term "lecithin" also encompasses mixtures of diacyl-glycerophospholipids. Such mixtures of diacyl-glycerophospholipids are typically present in commercial lecithin.

Lecithin is commercially available (e.g., from Central Soya, Fort Wayne, Ind., U.S.A. or Seydel-Wooley Co., Inc.) or can be obtained through known extraction and/or synthesis techniques. Commercial lecithin is a mixture of acetone-insoluble phosphatides. FCC specifies not less than 50% acetone-insoluble phosphatides. Lecithin, in form, is light brown to brown, a viscous semi-liquid with a characteristic odor, partly soluble in water and acetone, soluble in chloroform and benzene.

There are six (6) commercial grades of lecithin: the unbleached, single-bleached, and double-bleached lecithins of plastic consistency and of fluid consistency. Table 2 shows the general properties (approximate) of the six (6) common types of commercial lecithin.

TABLE 2

| General Properties (Approximate) of Commercial Lecithin | | | |
|---|---|---|---|
| Property | Value | Property | Value |
| Iodine Value | 95 | Phosphorus, % | 1.9 |
| Saponification Value | 196 | Unbound Carbohydrates, % | 5.0 |
| Sp Gr at 25° C. | 1.03 | Choline, % | 2.2 |
| pH | 6.6 | Inositol, % | 1.4 |
| Isoelectric Point, pH | 3.5 | Tocopherols, % | 0.1 |
| Ash, % | 7.0 | Sterols and Sterolglycosides, % | 3.5 |
| Total Nitrogen, % | 0.8 | Moisture, % | 0.75 |
| Amino Nitrogen, % | 0.4 | Other Mineral Matter (Mostly Potassium), % | 1.75 |

Of course, it is contemplated that two or more of any of the Components (A) through (D) of the ink compositions of the present invention can be employed. In addition, for safety reasons it is preferred that the inks of the present invention have a flash point of less than about 100° F.

The water-dissipatable polyester can be made by known techniques, for example, by those disclosed in U.S. Pat. No. 3,734,874, 3,779,993, and 4,233,196, the disclosures of which are incorporated herein by reference in their entirety.

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester, polyethylene or polypropylene, aluminum foil, glass, and paper.

The ink compositions of the present invention generally have a pH of about 8.2 or lower; preferred is a pH of about 7 to 8. If the pH is higher than about 8.2, there is a danger of the polymer(s) hydrolyzing which can result in gelling of the system under certain circumstances.

The polyester material can be dispersed in water or aqueous solution using the techniques described herein or known in the art and then blended with the other components. The following procedure can be used for dispersing the polyester in water: The water should be preheated to about 180° F. (82.22° C.) to about 200° F. (93.33° C.) and the polyester in pellet form is added rapidly to the vortex under high shear stirring. A Cowles Dissolver, Waring Blender, or similar equipment may be used. Once the water is heated to the desired temperature, additional heat input is not required. Depending upon the volume prepared, dispersion of the pellets should be complete within 15 to 30 minutes stirring. Continued agitation with cooling may be desirable to prevent thickening at the surface due to water evaporation. Viscosities of the dispersions remain low up to polyester levels of 25 percent to 30 percent and viscosities increase sharply above these levels. Viscosities of the dispersions will be influenced by the degree of polymer dispersion obtained which is affected by the dispersing temperature, shear, and time. The polyester blend content typically may range from about 15 percent to about 50 percent by weight of the aqueous dispersion with the preferred for most applications being from about 26 percent to about 38 percent.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows: The pigment is added to the polymer blend dispersion and, at a properly adjusted viscosity, dispersed there into with ball mill, sand mill, high-shear fluid flow mill, Cowles Dissolver, Katy Mill or the like. The pigments also may be dispersed directly in the polymer by milling on a heated two-roll mill at about 220° to 360° F. (104.44° to 182.22° C.) and using processing aids as desired, such as solvents or plasticizers. The viscosity and printing characteristics of the ink composition may be modified further by addition of water, solvents, plasticizers, sequestered wax, surfactants, and the like to suit the particular printing needs. The amounts and nature of these optional additives have been previously described herein.

During preparation of an ink, it is not particularly critical when the diacyl-glycerophospholipid is added. It can be added to the polymer dispersion or directly to the finished ink. Typically, to get complete dispersion or solubilization of the diacyl-glycerophospholipid, it is required to apply heat (e.g., 90° C.) and agitation for a sufficient time to achieve complete dispersion or solubilization.

The present invention is not limited to any type of pigment, can accommodate any pigment which can be dispersed, milled, mixed, blended or dissolved in any manner in either the polyester, water, or aqueous polymer system.

Exemplary useful C.I. pigments for use in the present invention are given in the following table:

| Pigments | |
|---|---|
| Generic Name | C.A. Index/Chemical Name |
| C.I. Pigment Yellow 17 | Butanamide, 2,2,-[(3,3'-dichloro[1,1'-biphenyl]-4,4'-diyl)bis(azo)bis[N-(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethylamino)-3-(ethylimino)-2,7-dimethyl-3H-xanthen-9-yl]-,ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl]-,ethyl ester, molybdatesilicate |
| C.I. Pigment Red 81:x | Benzoic acid, 2-[6-(ethyl amino)-3-(ethylimino)-2,7-dimethyl-3H-xanthen-9-yl]-ethyl ester, molybdatephosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo], calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino) 2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment White 6 | Titanium oxide (TiO$_2$) |
| C.I. Pigment Blue 15 | Copper, [29H, 31H phthalocyaninato (2-)N$^{29}$, N$^{30}$, N$^{31}$, N$^{32}$]-, (Sp-4-1)- |
| C.I. Pigment Yellow 12 | Butanamide, 2,2'-[(3,3'dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexadien-1-ylidene]methyl]phenyl]-amino]- |

-continued

| Pigments | |
|---|---|
| Generic Name | C.A. Index/Chemical Name |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis[N-(2-methylphenyl)-3-oxo- |
| C.I. Pigment Red 48:2 | 2-Naphthalenecarboxylic acid, 4-[(5-chloro-4-methyl-2-sulfophenyl)azo]-3-hydroxy-, calcium salt (1:1) |
| C.I. Pigment Blue 15:3 | Copper, [29H, 31H-phthalocyaninato (2-)-$N^{29}$, $N^{30}$, $N^{31}$, $N^{32}$]-, (SP-4-1) |
| C.I. Pigment Yellow 1 | Butanamide, 2-[(4-methyl-2-nitrophenyl)azo]-3-oxo-N-phenyl- |
| C. I. Pigment Yellow 3 | Butanamide, 2-[(4-chloro-2-nitrophenyl)azo]-N-(2-chlorophenyl)-3-oxo- |
| C. I. Pigment Yellow 13 | Butanamide, 2,2'-[(3,3'-dichloro[1,1'-biphenyl]-4,4'-diyl)bis(azo)bis[N-2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis[3-oxo-N-phenyl- |
| C.I. Pigment Yellow 55 | Butanamide, 2,2'-[(3,3'-dichloro[1,1'-biphenyl]-4,4'-diyl)bis(azo)]bis[N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis-(azo)]bis[2,4 dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis-(azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthylamine in toluene with phosphorous oxychloride and converted to the copper ferrocyanide salt (PTMA salt in P.Blue 1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl)phenyl]azo]-N-(2-ethoxyphenyl)-3-hydroxy- |
| C.I. Pigment Red 88 | Benzo[b]thiophen-3(2H)-one, 4,7-dichloro-2-(4,7-dichloro-3-oxobenzo[b]thien-2(3H)-ylidene)- |
| C.I. Pigment Yellow 151 | A diazotized aniline derivative coupled with an acetoacetyl derivative of 5-aminobenzimidazolone |
| C.I. Pigment Violet 23 | Diindolo[3,3',2'm]triphenodioxazine, 8-18-dichloro-5,15-diethyl-5,15-dihydro- |
| C.I. Pigment Red 184 | A diazotized substituted aniline coupled with a derivative of 3-hydroxy-2-naphthanilide |

-continued

| Pigments | |
|---|---|
| Generic Name | C.A. Index/Chemical Name |
| C.I. Pigment Blue 1:2 | Ethanaminium, N-[4-[[4-(diethylamino)phenyl][4-(ethylamino)-1-1 naphthalenyl]methylene] 2,5-cyclohexadien-1-ylidene]-N-ethyl-, [orthosilicate(4-)]hexatriacontaoxododeca-molybdate(4)-(4:1) |
| C.I. Pigment Red 3 | 2-Naphthalenol, 1-[(4-methyl-2-nitrophenyl)azo]- |
| C.I. Pigment Blue 15:1 | Copper, [29H, 32H-phthalocyaninato(2-)-$N^{29}$, $N^{30}$, $N^{31}$, $N^{32}$]-,(SP-4-1)- or Copper, [chloro-29H, 31H-phthalocyaninato (2-1)-$N^{29}$, $N^{30}$, $N^{31}$, $N^{32}$]- |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methylphenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 5 | 2-Naphthalenol, 1-](2,4-dinitrophenyl)azo]- |
| C.I. Pigment Orange 13 | 3H-Pyrazol-3-one, 4,4'-[3,3'-dichloro [1,1' biphenyl]-4,4'-diyl)bis-(azo)]bis[2,4-dihydro-5-methyl-2-phenyl- |
| C.I. Pigment Orange 34 | 3H-Pyrazol-3-one, 4,4'-[(3,3'-dichloro [1,1'-biphenyl]-4,4'-diyl)bis-(azo)]bis[2,4-dihydro-5-methyl-2-(4-methylphenyl)- |
| C.I. Pigment Red 10 | 2-Naphthalenecarboxamide, 4-[(2,5-dichloro-phenyl)-azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]2,5-cyclohexadien-1-ylidene]-N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3.xMnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

The following examples are to illustrate the invention but should not be interpreted as a limitation thereon. All percentages are by weight unless otherwise indicated. The symbol represents seconds.

EXAMPLE 1 POLYESTER PREPARATION

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 milliliter (mL) of a 1.0% (based on Ti) catalyst solution of titanium tetraisopropoxide, and 0.74 gram (g) (0.009 mole) of sodium acetate buffer is stirred and heated for two hours at 200°–220° C. The temperature is then raised to 275° C. and a vacuum of 0.3 millimeter (mm) is applied. Heating and stirring is continued for 1 hour under these conditions. After cooling, the polymer obtained has an inherent viscosity (I.V.) of 0.36 and is tough and rubbery. It is dissipatable in hot water to the extent of about 29 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4 cyclohexanedimethanol.

EXAMPLE 2 - POLYESTER DISPERSION PREPARATION

To 61 g of distilled or deionized water is added 29 g of polyester polymer from Example 1 with stirring. The mixture is heated at 85° C. for one hour with stirring. The dispersion is cooled to 35° C. and 10 g of n-propyl alcohol is added dropwise with stirring. The dispersion is allowed to cool to 25° C. with stirring and 0.007 g of Tektamer 38AD (biocide) is added with stirring. The clear polyester dispersion is designated PM-11138 and has the following composition:

| Component | Weight % |
| --- | --- |
| Polyester Polymer (Example 1) | 29 |
| n-Propyl Alcohol | 10 |
| Tektamer 38AD | 0.007 |
| Water | Balance |

In a similar fashion two other polyester dispersions are prepared. PM-10709 has the following composition:

| Component | Weight % |
| --- | --- |
| Polyester Polymer (Example 1) | 33 |
| Tektamer 30AD | 0.007 |
| Water | Balance |

PM-11141 has the following composition:

| Component | Weight % |
| --- | --- |
| Polyester Polymer (Example 1) | 32 |
| n-Propyl Alcohol | 5 |
| Tektamer 38AD | 0.007 |
| Water | Balance |

EXAMPLE 3 - Lecithin Incorporated in Polymer Dispersion

Add 650 g of distilled water to a 3 l, 3 mantle, round bottom flask and place in heating mantle. Add desired amounts of polyester as in Example 2; in addition, add a desired amount of lecithin. Gain temperature, upon agitation, to 90° C. until all polymer and lecithin have been dispersed in water. Hold at 90° C. for about 1 hour. Turn off heat and continue agitation while cooling. Add alcohol and biocide as desired as described in Example 2.

EXAMPLE 4 - PREPARATION OF INK

A. The inks used in the examples that follow had the following composition range:

| Components | | Weight % |
| --- | --- | --- |
| a. | Pigment | |
| | - Organic[1] | 0.1-12.5 |
| | - Inorganic[2] | 0.1-30.0 |
| b. | Polymer | 15.0-32.0 |
| c. | Wax[3] | 0.0-3.0 |
| d. | Surfactants[4] | 0.0-1.0 |
| e. | Lecithin[5] | 0.0-1.0 |
| f | Water | 35.0-65.0 |

[1]Blue C.I 15:3; Red C.I. 22; Yellow C.I. 14; Black C.I. 7
[2]TiO$_2$ only (E.I. Du Pont)
[3]Polyethylene Emulsion (S. C. Johnson) or Oxypol 670 Dry Polyethylene (Daemeschieska)
[4]Surfynol 104E, 440 (Union Carbide) Foamaster 111 (Diamond Shamrock)
[5]SICO NS Concentrate (Seydel-Wooley Co., Inc.)

B. Pigment Dispersions and Millbases

Pigment dispersions and millbases were either purchased commercially or prepared by the procedure that follow.

C.I.-15:3 - Phthalo Blue Dispersion

This dispersion was a purchased color dispersion designated BHD6026 from Sun Chemical, Cincinnati, Oh. The dispersion has a concentration of C.I.-15:3 phthalo blue pigment of about 45% by weight.

C.I.-15:3 - Phthalo Blue Millbase

The millbase was prepared as follows:

The pigment is premixed in Eastek Polymer dispersion and water using a Dispax in-line disperser to wet the pigment and to reduce agglomerate size. The viscosity of the mix is increased to 1,000 cps (±200) (1.0 Pa•s), 36° C., Spindle #2, 152 sec. (−1) Rheomat viscometer with Acrysol RM-825.

The base is milled using a Metzsch horizontal, closed media mill until the strength is >90% versus the standard.

The millbase had the following composition:

| Component | Weight % |
| --- | --- |
| Polyester (substantially as described in Example 1) | 14.88 |
| C.I.-15:3 Phthalo Blue Pigment B2GA (Hoechst) | 27.80 |
| n-Propanol | 5.13 |
| Acrysol RM-825 | 1.69 |
| Tektamer 38LV | .30 |
| Water | 50.20 |

C.I.-14-AAOT Diarylide Yellow Millbase

The millbase was prepared as follows:

The pigment is premixed in Eastek Polymer dispersion and water using a Dispax in-line disperse to wet pigment and to reduce agglomerate size. The viscosity of the mix is increased to 1,000 cps (±200) (1.0 Pa.s), 36° C., Spindle #2 152 sec. (−1) Rheomat viscometer with Acrysol RM-825.

The base is milled using a Metzsch horizontal, closed media mill until the strength is >90% versus the standard.

The millbase had the following composition:

| Component | Weight % |
|---|---|
| Polyester (substantially as described in Example 1) | 13.97 |
| C.I.-14-AAOT Diarylide Yellow Pigment | 23.24 |
| n-Propanol | 4.82 |
| Tektamer | .30 |
| Water | 57.67 |

C.I.-14-AAOT Diarylide Yellow Dispersion

This dispersion was purchased from Sun Chemical, Cincinnati, Ohio, and had the designation YCD-7107 "C" Series (opaque). The dispersion has a concentration of C.I.-14-AAOT diarylide yellow pigment of about 35% by weight.

C.I.-22-Scarlet Y Millbase

This millbase was prepared as follows:

The pigment is premixed in Eastek Polymer dispersion and water using a Dispax in-line disperser to wet the pigment and to reduce agglomerate size. The viscosity of the mix is increased to 1,000 cps ($\pm$200) (1.0 Pa$\bullet$s), 36° C., Spindle #2, 152 sec. ($-$1) Rheomat viscometer with Acrysol RM-825.

The base is milled using a Metzsch horizontal, closed media mill until the strength is >90% versus the standard.

The millbase had the following composition:

| Component | Weight % |
|---|---|
| Polyester (substantially as described in Example 1) | 12.70 |
| C.I.-22 Scarlet Y Pigment | 24.50 |
| n-Propanol | 4.40 |
| Tektamer | .30 |
| Acrysol RM-825 | 1.55 |
| Water | 53.87 |

C.I.-22-Scarlet Y Dispersion

This dispersion was purchased from Sun Chemical, Cincinnati, OH, and had the designation RFD 4247. The dispersion had a concentration of C.I..22 Scarlet Y pigment of about 33% by weight.

C.I.-7-Carbon Black Millbase

The millbase was prepared as follows:

The pigment is premixed in Eastek Polymer dispersion and water using a Dispax in-line disperser to wet the pigment and to reduce agglomerate size. The viscosity of the mix is increased to 1,000 cps ($\pm$200) (1.0 Pa$\bullet$s), 36° C., Spindle #2, 152 sec. ($-$1) Rheomat viscometer with Acrysol RM-825.

The base is milled using a Metzsch horizontal, closed media mill until the strength is >90% versus the standard.

The millbase had the following composition:

| Component | Weight % |
|---|---|
| Polyester (substantially as described in Example 1) | 15.08 |
| C.I.-7 Carbon Black Pigment | 30.00 |
| n-Propanol | 6.20 |
| Tektamer | 1.11 |
| Surfynol 104-E | 1.00 |
| Water | 46.61 |

C. Preparation of Overprint 450 g of polyester dispersion (PM-10709) was added to the Waring blender at low speed; then, 50 g normal propyl alcohol was slowly added to the vortex. The blender was then turned to high speed agitation and 15 g dry polyethylene wax was added to the mixture and allowed to mix, covered, at high speed for about 15 minutes. Overprint was adjusted to a viscosity of 22"-25" #2 Zahn cup.

D. Finished Inks

Desired amounts of polymer dispersion, pigment dispersion or millbase, defoamer and lecithin were mixed on a Waring blender at low speed for about 10 minutes. All inks were adjusted to a viscosity of 22"-25" #2 Zahn cup and contained 10% pigment (dry weight).

EXAMPLE 5 - SAMPLE PREPARATION

Neat Ink to be Tested

Ink to be tested from Example 4 was printed on the automated Geiger proof press with a 175 line etched gravure cylinder, on 55-lb. clay coated paper.

B. Overprinted Ink to be Tested

The proofs prepared on the Geiger proof press were then overprinted with a #1 R.D. rod on the laboratory automated K-Coater with the overprint from Example 4. All proofs were allowed to age, ambient (25° C.) for 24 hours.

EXAMPLE 6 - BLOCK RESISTANCE TESTS

A Sentinel heat sealer testing was conducted at 40 psi, 5 seconds dwell-time. The ink films were tested face to face starting at 110° F. (43.33° C.), and further by raising the temperature in 10° F. increments. In some cases testing started at 100° F. (37.78° C.). Spring load testing was conducted at 40 psi. The ink films were tested face to face and were placed in a 120° F. (48.89° C.) oven for 16 hours. The block testing was in accordance with ASTM Procedure D-918. The ink samples were prepared as described in Example 5. Six inks were prepared for each pigment and were labelled A through F. The results are in the following Tables I through VII.

TABLE I

| Ingredient | Composition (Wt. %) | | | | | |
|---|---|---|---|---|---|---|
| | A | B | C | D | E | F |
| Polymer Dispersion PM-11138 | 75.50 | 77.40 | 77.15 | 76.90 | 76.65 | 76.40 |
| C.I.-15:3- | 22.50 | 22.50 | 22.50 | 22.50 | 22.50 | 22.50 |

TABLE I-continued

| | Composition (Wt. %) | | | | | |
|---|---|---|---|---|---|---|
| | A | B | C | D | E | F |
| Phthalo Blue Dispersion | | | | | | |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 20″ | 20″ | 20″ | 20″ | 20″ | 20″ |
| No. 2 Zahn Viscosity 120° F., 7 Days Aging | 20″ | 20″ | 20″ | 20″ | 20″ | 22″ |
| No. 2 Zahn Viscosity Freeze-Thaw, 7 Days @ 0° F. | 20″ | 20″ | 20″ | 20″ | 20″ | 20″ |
| Maximum Block Resistance Neat Ink* | 100° F. (37.78° C.) | 110° F. (43.33° C.) | 120° F. (48.89° C.) | 120° F. (48.89° C.) | 120° F. (48.89° C.) | 120° F. (48.89° C.) |
| Maximum Block Resistance Overprinted Ink* | 110° F. (43.33° C.) | 120° F. (48.89° C.) | 120° F. (48.89° C.) | 120° F. (48.89° C.) | 120° F. (48.89° C.) | 120° F. (48.89° C.) |

*No Trace of Paper Rupture

TABLE II

| | Sample Composition (Wt. %) | | | | | |
|---|---|---|---|---|---|---|
| | A | B | C | D | E | F |
| Ingredient | | | | | | |
| Polymer Dispersion PM-11138 | 58.00 | 57.90 | 57.65 | 57.40 | 57.25 | 56.90 |
| C.I.-15:3-Phthalo Blue Millbase | 42.00 | 42.00 | 42.00 | 42.00 | 42.00 | 42.00 |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 21″ | 21″ | 21″ | 21″ | 22″ | 22″ |
| No. 2 Zahn Viscosity 120° F., 7 Days Aging | 20″ | 20″ | 20″ | 20″ | 21″ | 21″ |
| No. 2 Zahn Viscosity Freeze-Thaw, 7 Days @ 0° F. | 21″ | 21″ | 21″ | 21″ | 22″ | 22″ |
| Maximum Block Resistance Neat Ink* | 120° F. (48.89° C.) | 120° F. (48.89° C.) | 130° F. (54.44° C.) | 130° F. (54.44° C.) | 130° F. (54.44° C.) | 130° F. (54.44° C.) |
| Maximum Block Resistance Overprinted Ink* | 120° F. (48.89° C.) | 120° F. (48.89° C.) | 120° F. (48.89° C.) | 120° F. (48.89° C.) | 120° F. (48.89° C.) | 120° F. (48.89° C.) |

*No Trace of Paper Rupture

TABLE III

| | Composition (Wt. %) | | | | | |
|---|---|---|---|---|---|---|
| | A | B | C | D | E | F |
| Ingredient | | | | | | |
| Polymer Dispersion PM-11138 | 57.00 | 56.90 | 56.65 | 56.40 | 56.15 | 55.90 |
| C.I.-14-AAOT Diarylide Yellow Millbase | 43.00 | 43.00 | 43.00 | 43.00 | 43.00 | 43.00 |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 27″ | 27″ | 27″ | 28″ | 29″ | 30″ |
| No. 2 Zahn Viscosity 120° F., 7 Days Aging | 39″ | 39″ | 39″ | 40″ | 40″ | 43″ |
| No. 2 Zahn Viscosity Freeze-Thaw, | 23″ | 23″ | 24″ | 29″ | 29″ | 30″ |

TABLE III-continued

| | Composition (Wt. %) | | | | | |
|---|---|---|---|---|---|---|
| | A | B | C | D | E | F |
| 7 Days @ 0° F. | | | | | | |
| Maximum Block Resistance Neat Ink* | 120° F. (48.89° C.) | 120° F. (48.89° C.) | 120° F. (48.89° C.) | 120° F. (48.89° C.) | 120° F. (48.89° C.) | 120° F. (48.89° C.) |
| Maximum Block Resistance Overprinted Ink* | 130° F. (54.44° C.) | 130° F. (54.44° C.) | 130° F. (54.44° C.) | 130° F. (54.44° C.) | 130° F. (54.44° C.) | 130° F. (54.44° C.) |

*No Trace of Paper Rupture

TABLE IV

| | Composition (Wt. %) | | | | | |
|---|---|---|---|---|---|---|
| | A | B | C | D | E | F |
| Ingredient | | | | | | |
| Polymer Dispersion PM-11138 | 50.00 | 49.90 | 49.65 | 49.40 | 49.15 | 48.90 |
| C.I.-14-AAOT Diarylide Yellow Dispersion | 50.00 | 50.00 | 50.00 | 50.00 | 50.00 | 50.00 |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 26" | 26" | 26" | 26" | 26" | 26" |
| No. 2 Zahn Viscosity 120° F., 7 Days Aging | 60" | >60" | 51" | 46" | 47" | 47" |
| No. 2 Zahn Viscosity Freeze-Thaw, 7 Days @ 0° F. | 25" | 27" | 26" | 24" | 23" | 23" |
| Maximum Block Resistance Neat Ink* | 100° F. (37.78° C.) | 100° F. (37.78° C.) | 110° F. (43.33° C.) | 110° F. (43.33° C.) | 120° F. (48.89° C.) | 120° F. (48.89° C.) |
| Maximum Block Resistance Overprinted Ink* | 120° F. (48.89° C.) | 120° F. (48.89° C.) | 120° F. (48.89° C.) | 120° F. (48.89° C.) | 120° F. (48.89° C.) | 120° F. (48.89° C.) |

*No Trace of Paper Rupture

TABLE V

| | Composition (Wt. %) | | | | | |
|---|---|---|---|---|---|---|
| | A | B | C | D | E | F |
| Ingredient | | | | | | |
| Polymer Dispersion PM-11138 | 58.00 | 57.90 | 57.65 | 57.40 | 57.15 | 56.90 |
| C.I.-22- Scarlet Y Millbase | 42.00 | 42.00 | 42.00 | 42.00 | 42.00 | 42.00 |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 26" | 26" | 26" | 27" | 28" | 33" |
| No. 2 Zahn Viscosity 120° F., 7 Days Aging | 30" | 28" | 31" | 35" | 37" | 42" |
| No. 2 Zahn Viscosity Freeze-Thaw, 7 Days @ 0° F. | 23" | 23" | 24" | 25" | 25" | 25" |
| Maximum Block Resistance Neat Ink* | 110° F. (43.33° C.) | 110° F. (43.33° C.) | 120° F. (48.89° C.) | 120° F. (48.89° C.) | 120° F. (48.89° C.) | 130° F. (54.44° C.) |
| Maximum Block Resistance Overprinted Ink* | 130° F. (54.44° C.) | 130° F. (54.44° C.) | 130° F. (54.44° C.) | 130° F. (54.44° C.) | 130° F. (54.44° C.) | 130° F. (54.44° C.) |

*No Trace of Paper Rupture

TABLE VI

| | Composition (Wt. %) | | | | | |
|---|---|---|---|---|---|---|
| | A | B | C | D | E | F |
| Ingredient | | | | | | |
| Polymer Dispersion PM-11138 | 71.00 | 70.90 | 70.65 | 70.40 | 70.15 | 69.90 |
| C.I.-22-Scarlet Y Dispersion | 29.00 | 29.00 | 29.00 | 29.00 | 29.00 | 29.00 |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 24" | 24" | 25" | 25" | 25" | 25" |
| No. 2 Zahn Viscosity 120° F., 7 Days Aging | 23" | 23" | 23" | 25" | 25" | 25" |
| No. 2 Zahn Viscosity Freeze-Thaw, 7 Days @ 0° F. | 23" | 23" | 23" | 23" | 24" | 24" |
| Maximum Block Resistance Neat Ink* | 120° F. (48.89° C.) | 120° F. (48.89° C.) | 130° F. (54.44° C.) | 130° F. (54.44° C.) | 130° F. (54.44° C.) | 130° F. (54.44° C.) |
| Maximum Block Resistance Overprinted Ink* | 130° F. (54.44° C.) | 130° F. (54.44° C.) | 130° F. (54.44° C.) | 130° F. (54.44° C.) | 130° F. (54.44° C.) | 140° F. (60° C.) |

*No Trace of Paper Rupture

TABLE VII

| | Composition (Wt. %) | | | | | |
|---|---|---|---|---|---|---|
| | A | B | C | D | E | F |
| Ingredient | | | | | | |
| Polymer Dispersion PM-11138 | 66.50 | 66.40 | 66.15 | 65.90 | 65.65 | 65.40 |
| C.I.-7-Carbon Black Millbase | 33.50 | 33.50 | 33.50 | 33.50 | 33.50 | 33.50 |
| Defoamer | 0 | .10 | .10 | .10 | .10 | .10 |
| Lecithin | 0 | 0 | .25 | .50 | .75 | 1.00 |
| Properties | | | | | | |
| Initial Viscosity No. 2 Zahn | 22" | 22" | 22" | 22" | 22" | 23" |
| No. 2 Zahn Viscosity 120° F., 7 Days Aging | 22" | 22" | 23" | 24" | 24" | 25" |
| No. 2 Zahn Viscosity Freeze-Thaw, 7 Days @ 0° F. | 22" | 23" | 23" | 23" | 23" | 24" |
| Maximum Block Resistance Neat Ink* | 110° F. (43.33° C.) | 110° F. (43.33° C.) | 120° F. (48.89° C.) | 130° F. (54.44° C.) | 130° F. (54.44° C.) | 130° F. (54.44° C.) |
| Maximum Block Resistance Overprinted Ink* | 130° F. (54.44° C.) | 130° F. (54.44° C.) | 130° F. (54.44° C.) | 130° F. (54.44° C.) | 130° F. (54.44° C.) | 130° F. (54.44° C.) |

*No Trace of Paper Rupture

EXAMPLE 7 - SLIDE ANGLE

A composite neutral gray ink was prepared of equal parts of C.I.-14 yellow, C.I.-22 red, and C.I.-15:3 blue color dispersions in PM-11138 polyester dispersion. The ink was printed onto 55-lb. clay coated paper as described in Example 5. The printed proofs were then overprinted with various polyester dispersion formulations in a similar fashion as described in Example 5. Inks and overprints were prepared in a similar fashion as described in Example 4. The overprints were polyester dispersions PM-11138, PM-10709 and PM-11141 as described in Example 2 which further contained 0-0.1 weight % defoamer and 0-1 weight % lecithin.

Overprints were tested in triplicate on coefficient of friction tester available from Technical Measurements, Inc. Three slide angle readings were obtained, and an average taken by dividing the sum of the three readings by three. Slide angle measurements were in accordance with ASTM Procedure D-3248-73. Results are in Tables VIII, IX and X. The overprint used to obtain the results in Table VIII was dispersion PM-10709, for Table IX it was PM-11141, and for Table X it was PM-11138.

TABLE VIII

| | Composition (Wt. %) | | | | | |
|---|---|---|---|---|---|---|
| | A | B | C | D | E | F |
| Overprint Ingredient | | | | | | |
| Polymer Dispersion | 100 | 99.9 | 99.65 | 99.4 | 99.15 | 98.9 |

TABLE VIII-continued

| | Composition (Wt. %) | | | | | |
|---|---|---|---|---|---|---|
| | A | B | C | D | E | F |
| (PM-10709) | | | | | | |
| Defoamer | 0 | .10 | .10 | .10 | .10 | .10 |
| Lecithin | 0 | 0 | .25 | .50 | .75 | 1.00 |
| Properties | | | | | | |
| Slide Angle (Average of Three Readings) | 30.3 | 26.0 | 18.7 | 16.6 | 13.6 | 12.7 |

TABLE IX

| | Composition (Wt. %) | | | | | |
|---|---|---|---|---|---|---|
| | A | B | C | D | E | F |
| Overprint Ingredient | | | | | | |
| Polymer Dispersion (PM-11141) | 100 | 99.9 | 99.65 | 99.4 | 99.15 | 98.9 |
| Defoamer | 0 | .10 | .10 | .10 | .10 | .10 |
| Lecithin | 0 | 0 | .25 | .50 | .75 | 1.00 |
| Properties | | | | | | |
| Slide Angle (Average of Three) | 28.1 | 26.3 | 17.4 | 14.8 | 12.8 | 14.3 |

TABLE X

| | Composition (Wt. %) | | | | | |
|---|---|---|---|---|---|---|
| | A | B | C | D | E | F |
| Overprint Ingredient | | | | | | |
| Polymer Dispersion (PM-11138) | 100 | 99.9 | 99.65 | 99.4 | 99.15 | 98.9 |
| Defoamer | 0 | .10 | .10 | .10 | .10 | .10 |
| Lecithin | 0 | 0 | .25 | .50 | .75 | 1.00 |
| Properties | | | | | | |
| Slide Angle (Average of Three) | 26.8 | 21.9 | 16.8 | 14.6 | 13.3 | 13.4 |

EXAMPLE 8 - Rub Resistance

The same overprints tested in Example 7 for slide angle were also tested for rub resistance in accordance with British Standard Procedure BS-3110.

Rub resistance was tested on the Sutherland Rubometer at 50 cycles with a 2 lb. (0.91 kg) weight, and at 100 cycles with a 2 lb. (0.91 kg) weight. Tests were conducted in triplicate and the results were evaluated employing the following scale:

| | | |
|---|---|---|
| Best | 1 | - No visible scuff marks |
| | 2 | - Very slight scuff marks |
| | 3 | - Slight scuff marks |
| | 4 | - Moderate scuff marks |
| Worst | 5 | - Paper rupture |

An average reading was assigned to each of the rub resistance tests.

The results are in Tables XI, XII and XIII. The overprint used to obtain the results in Table XI was dispersion PM-10709, for Table XII was PM-11141, and for Table XIII it was PM-11138.

TABLE XI

| | Composition (Wt. %) | | | | | |
|---|---|---|---|---|---|---|
| | A | B | C | D | E | F |
| Overprint Ingredient | | | | | | |
| Polymer Dispersion (PM-10709) | 100 | 99.9 | 99.65 | 99.4 | 99.15 | 98.9 |
| Defoamer | 0 | .10 | .10 | .10 | .10 | .10 |
| Lecithin | 0 | 0 | .25 | .50 | .75 | 1.00 |
| Properties | | | | | | |
| Rub Resistance 2 Lbs. (0.91 kg) × 50 Cycles (Average of Three) | 3 | 5 | 1.3 | 1 | 1 | 1 |
| Rub Resistance 2 Lbs. (0.91 kg) × 100 Cycles (Average of Three) | 4 | 5 | 1.3 | 1 | 1.3 | 1.3 |

TABLE XII

| | Composition (Wt. %) | | | | | |
|---|---|---|---|---|---|---|
| | A | B | C | D | E | F |
| Overprint Ingredient | | | | | | |
| Polymer Dispersion (PM-11141) | 100 | 99.9 | 99.65 | 99.4 | 99.85 | 98.9 |
| Defoamer | 0 | .10 | .10 | .10 | .10 | .10 |
| Lecithin | 0 | 0 | .25 | .50 | .75 | 1.00 |
| Properties | | | | | | |
| Rub Resistance 2 Lbs. (0.91 kg) × 50 Cycles (Average of Three) | 4 | 4 | 2.3 | 1.3 | 1 | 1.3 |
| Rub Resistance 2 Lbs. (0.91 kg) × 100 Cycles (Average of Three) | 5 | 5 | 2 | 1.3 | 1 | 1 |

TABLE XIII

| | Composition (Wt. %) | | | | | |
|---|---|---|---|---|---|---|
| | A | B | C | D | E | F |
| Overprint Ingredient | | | | | | |
| Polymer Dispersion (PM-11138) | 100 | 99.9 | 99.65 | 99.4 | 99.85 | 98.9 |
| Defoamer | 0 | .10 | .10 | .10 | .10 | .10 |
| Lecithin | 0 | 0 | .25 | .50 | .75 | 1.00 |
| Properties | | | | | | |
| Rub Resistance 2 Lbs. (0.91 kg) × 50 Cycles (Average of Three) | 4 | 3 | 1 | 1.3 | 1 | 1 |
| Rub Resistance 2 Lbs. (0.91 kg) × 100 Cycles (Average of Three) | 5 | 5 | 2.3 | 1.3 | 2 | 1 |

The invention has been described in detail with particular reference to preferred embodiments thereof, but it will be understood that variations and modifications can be effected within the spirit and scope of the invention.

We claim:

1. An ink composition or concentrate thereof comprising:
(A) about 4 to 80 weight percent of one or more water-dissipatable or dispersible polymers having carbonyloxy linking groups the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows wherein all stated mole percentages are based on the total of all acid, hydroxyl, and amino equivalents being equal to 200 mole %:
 (a) at least one difunctional dicarboxylic acid;
 (b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;
 (c) at least one difunctional reactant selected from a glycol or a mixture of a glycol and diamine having two —NRH groups, the glycol containing two —CH$_2$—OH groups of which
  (1) at least 15 mole % is a poly(ethylene glycol) having the structural formula

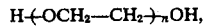
  H—(OCH$_2$—CH$_2$)$_n$—OH, n being an integer of from 2 to about 20, or
  (2) of which from about 0.1 to less than about 15 mole % is a poly(ethylene glycol) having the structural formula

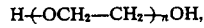
  H—(OCH$_2$—CH$_2$)$_n$—OH, n being an integer of between 2 and about 500, and with the proviso that the mole % of said poly(ethylene glycol) within said range is inversely proportional to the quantity of n within said range; and
 (d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants; wherein each R in the (c) and (d) reactants is a hydrogen atom or an alkyl group of 1 to 4 carbons;
(B) 0 to about 60 weight percent pigment material;
(C) 0 to about 95 weight percent water; and
(D) an effective amount to improve the block and rub resistance, and slide angle of at least one diacyl-glycerophospholipid.

2. An ink composition or concentrate thereof comprising:
(A) about 4 to 80 weight percent of one or more water-dissipatable or dispersible polymers having carbonyloxy linking groups the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows wherein all stated mole percentages are based on the total of all acid, hydroxyl, and amino equivalents being equal to 200 mole %:
 (a) at least one difunctional dicarboxylic acid;
 (b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;
 (c) at least one difunctional reactant selected from a glycol or a mixture of a glycol and diamine having two —NRH groups, the glycol containing two —CH$_2$-OH groups of which
  (1) at least 15 mole % is a poly(ethylene glycol) having the structural formula

  H—(OCH$_2$—CH$_2$)$_n$—OH, n being an integer of from 2 to about 20, or
  (2) of which from about 0.1 to less than about 15 mole % is a poly(ethylene glycol) having the structural formula

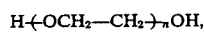
  H—(OCH$_2$—CH$_2$)$_n$—OH, n being an integer of between 2 and about 500, and with the proviso that the mole % of said poly(ethylene glycol) within said range is inversely proportional to the quantity of n within said range; and
 (d) from none to about 40 mole % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants; wherein each R in the (c) and (d) reactants is a hydrogen atom or an alkyl group of 1 to 4 carbons;
(B) 0 to about 60 weight percent pigment material;
(C) 0 to about 95 weight percent water; and
(D) from about 0.25 to about 5 weight percent of a diacyl-glycerophospholipid.

3. The ink composition of claim 1 wherein Component (B) is present in an amount of at least 0.5 weight percent.

4. The ink composition of claim 2 wherein Component (B) is present in an amount of at least 0.5 weight percent.

5. The ink composition of claim 2 wherein Component (A) is present in an amount of about 5 to 40 weight percent, Component (B) is present in an amount of about 0 to 35 weight percent, Component (C) is present in an amount of about 35 to 90 weight percent, and Component (D) is present in an amount of about 0.5 to 2 weight percent.

6. The ink composition of claim 5 wherein Component (D) is present in an amount of about 0.75 to about 1 weight percent.

7. The ink composition of claim 2 additionally comprising up to about 15 weight percent of one or more additional additives.

8. The ink composition of claim 2 additionally containing up to about 3 weight percent of one or more additional additives selected from the group consisting of an emulsion stabilizer, a surfactant, a dispersant, a biocide, and a pH stabilizer.

9. The ink composition of claim 1 wherein said diacyl-glycerophospholipid is of the formula

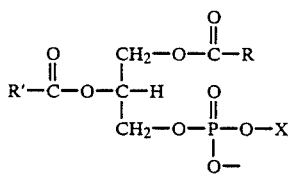

wherein R and R' are the same or different and are fatty alkyl groups containing up to 20 carbon atoms, and X is H or a residue of an alcohol.

10. The ink composition of claim 2 wherein said diacyl-glycerophospholipid is of the formula

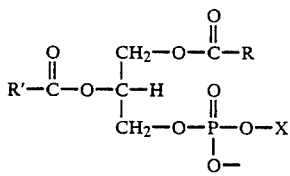

wherein R and R' are the same or different and are fatty alkyl groups containing up to 20 carbon atoms, and X is H or a residue of an alcohol.

11. The ink composition of claim 9 wherein R and R' are independently selected from a residue of palmitic acid, stearic acid, oleic acid, linoleic acid and arachidonic acid; and X is H or is selected from a residue of choline, ethanolamine, serine, myo-inositol, inositol-4-phosphate, inositol-4,5-diphosphate, inositol mannoside, glycerol, aminoacyl glycerol, and glucosaminyl glycerol.

12. The ink composition of claim 10 wherein R and R' are independently selected from a residue of palmitic acid, stearic acid, oleic acid, linoleic acid and arachidonic acid; and X is H or is selected from a residue of choline, ethanolamine, serine, myoinositol, inositol-4-phosphate, inositol-4,5-diphosphate, inositol mannoside, glycerol, aminoacyl glycerol, and glucosaminyl glycerol.

13. The composition of claim 1 wherein the polymeric material comprises one or more polyester materials having an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof, and the pigment material is present in a weight ratio with respect to total polyester materials of from about 0 to about 2/1.

14. The composition of claim 2 wherein the polymeric material comprises one or more polyester materials having an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4.cyclohexanedimethanol or ethylene glycol or mixtures thereof, and the pigment material is present in a weight ratio with respect to total polyester materials of from about 0 to about 2/1.

15. The composition of claim 13 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole diethylene glycol and conversely from about 48 to about 44 mole % 1,4-cyclohexanedimethanol.

16. The composition of claim 14 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

17. The ink composition of claim 3 wherein the pigment is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3.

18. The ink composition of claim 4 wherein the pigment is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3.

19. An ink composition comprising:
(A) about 15 to 32 weight percent of one or more water-dissipatable or dispersible polymers having carbonyloxy linking groups the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.5 gram of polymer in 100 mL of the solvent, the polymer containing substantially equimolar proportions of acid equivalents (100 mole %) to hydroxy and amino equivalents (100 mole %), the polymer comprising the reaction products of reactants selected from (a), (b), (c), and (d), or the ester forming or esteramide forming derivatives thereof, as follows wherein all stated mole percentages are based on the total of all acid, hydroxyl, and amino equivalents being equal to 200 mole %:

(a) at least one difunctional dicarboxylic acid;
(b) from about 4 to about 25 mole % of at least one difunctional sulfomonomer containing at least one metallic sulfonate group or nitrogen-containing nonmetallic sulfonate group attached to an aromatic or cycloaliphatic nucleus wherein the functional groups are hydroxy, carboxyl, or amino;
(c) at least one difunctional reactant selected from a glycol or a mixture of a glycol and diamine having two —NRH groups, the glycol containing two —$CH_2$—OH groups of which
  (1) at least 15 mole % is a poly(ethylene glycol) having the structural formula $$H\text{---}(OCH_2\text{---}CH_2)_n\text{---}OH,$$

n being an integer of from 2 to about 20, or of which from about 0.1 to less than about 15 mole % is a poly(ethylene glycol) having the structural formula $$H\text{---}(OCH_2\text{---}CH_2)_n\text{---}OH,$$

n being an integer of between 2 and about 500, and with the proviso that the mole % of said poly(ethylene glycol) within said range is inversely proportional to the quantity of n within said range; and
(d) from none to about 40 mole % of difunctional reactant selected from hydroxycarboxylic acids having one —$C(R)_2$—OH group, aminocarboxylic acids having one —NRH group, amino-alcohols having one —$C(R)_2$—OH group and one —NRH group, or mixtures of said difunctional reactants; wherein each R in the (c) and (d) reactants is a hydrogen atom or an alkyl group of 1 to 4 carbons;
(B) 0 to 30 weight percent pigment material,
(C) from about 35 to 65 weight percent water,
(D) from about 0.75 to 1 weight percent lecithin,
(E) 0 to about 3 weight percent wax,
(F) 0 to about 3 weight percent additional surfactant,
(G) 0 to about 10 weight percent of an alcohol containing 1 to 10 carbon atoms,
(H) from about 0.1 to 0.25 weight percent of a defoamer, and
(I) 0 to 1 weight percent of a biocide.

* * * * *